US011679764B2

(12) United States Patent
Choe et al.

(10) Patent No.: US 11,679,764 B2
(45) Date of Patent: Jun. 20, 2023

(54) METHOD FOR AUTONOMOUSLY DRIVING A VEHICLE BASED ON MOVING TRAILS OF OBSTACLES SURROUNDING THE VEHICLE

(71) Applicant: Baidu USA LLC, Sunnyvale, CA (US)

(72) Inventors: Tae Eun Choe, Sunnyvale, CA (US); Guang Chen, Sunnyvale, CA (US); Weide Zhang, Sunnyvale, CA (US); Yuliang Guo, Sunnyvale, CA (US); Ka Wai Tsoi, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 678 days.

(21) Appl. No.: 16/457,847

(22) Filed: Jun. 28, 2019

(65) Prior Publication Data
US 2020/0406893 A1    Dec. 31, 2020

(51) Int. Cl.
*B60W 30/095* (2012.01)
*B60W 30/09* (2012.01)
*G05D 1/00* (2006.01)
*G06V 20/58* (2022.01)
*G06V 20/56* (2022.01)

(52) U.S. Cl.
CPC ........ *B60W 30/0956* (2013.01); *B60W 30/09* (2013.01); *B60W 30/0953* (2013.01); *G05D 1/0088* (2013.01); *G06V 20/58* (2022.01); *G06V 20/588* (2022.01); *G05D 2201/0213* (2013.01)

(58) Field of Classification Search
None
See application file for complete search history.

(56) References Cited

U.S. PATENT DOCUMENTS

| | | | |
|---|---|---|---|
| 2016/0297438 A1* | 10/2016 | Han | B60W 30/165 |
| 2017/0154225 A1* | 6/2017 | Stein | G06K 9/00798 |
| 2017/0158197 A1* | 6/2017 | Johnson | B60W 10/20 |
| 2017/0344855 A1* | 11/2017 | Mande | G08G 1/0175 |
| 2018/0203453 A1* | 7/2018 | Hardy | G08G 1/096725 |
| 2018/0238696 A1* | 8/2018 | Takeda | G01C 21/3694 |
| 2019/0092331 A1* | 3/2019 | Ide | B62D 15/026 |
| 2019/0114921 A1* | 4/2019 | Cazzoli | G06V 20/58 |
| 2019/0138007 A1* | 5/2019 | Baghsorkhi | G05D 1/0278 |
| 2019/0220014 A1* | 7/2019 | Bradley | G05D 1/0212 |
| 2019/0337513 A1* | 11/2019 | Kim | B60W 30/12 |

(Continued)

*Primary Examiner* — Aniss Chad
*Assistant Examiner* — Jennifer M Anda
(74) *Attorney, Agent, or Firm* — Womble Bond Dickinson (US) LLP

(57) ABSTRACT

During the autonomous driving, the movement trails or moving history of obstacles, as well as, an autonomous driving vehicle (ADV) may be maintained in a corresponding buffer. For the obstacles and the ADV, the vehicle states at different points in time are maintained and stored in one or more buffers. The vehicle states representing the moving trails or moving history of the obstacles and the ADV may be utilized to reconstruct a history trajectory of the obstacles and the ADV, which may be used for a variety of purposes. For example, the moving trails or history of obstacles may be utilized to determine lane configuration of one or more lanes of a road, particularly, in a rural area where the lane markings are unclear. The moving history of the obstacles may also be utilized predict the future movement of the obstacles, tailgate an obstacle, and infer a lane line.

18 Claims, 7 Drawing Sheets

(56) References Cited

U.S. PATENT DOCUMENTS

| | | | |
|---|---|---|---|
| 2020/0018606 A1* | 1/2020 | Wolcott | G05D 1/0219 |
| 2020/0125102 A1* | 4/2020 | Jiang | G05D 1/021 |
| 2020/0247402 A1* | 8/2020 | Bouton | B60W 30/18154 |
| 2020/0272838 A1* | 8/2020 | Vladimerou | G06K 9/00798 |
| 2020/0310420 A1* | 10/2020 | Scorcioni | B60W 60/0011 |
| 2020/0364882 A1* | 11/2020 | Feng | G06V 20/40 |
| 2021/0122369 A1* | 4/2021 | Chen | B60R 21/00 |
| 2022/0105926 A1* | 4/2022 | Zhang | G08G 1/166 |

* cited by examiner

METHOD FOR AUTONOMOUSLY DRIVING A VEHICLE BASED ON MOVING TRAILS OF OBSTACLES SURROUNDING THE VEHICLE

TECHNICAL FIELD

Embodiments of the present disclosure relate generally to operating autonomous vehicles. More particularly, embodiments of the disclosure relate to autonomously driving a vehicle based on moving history of the obstacles surrounding the vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. During the planning operations, it is important to accurately determine the lane configuration and predicting the movement of obstacles detected on the road. Especially, when driving in a rural area where the lane markings are not clear, it is difficult to determine the lane configuration and predicting the movement of the obstacles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
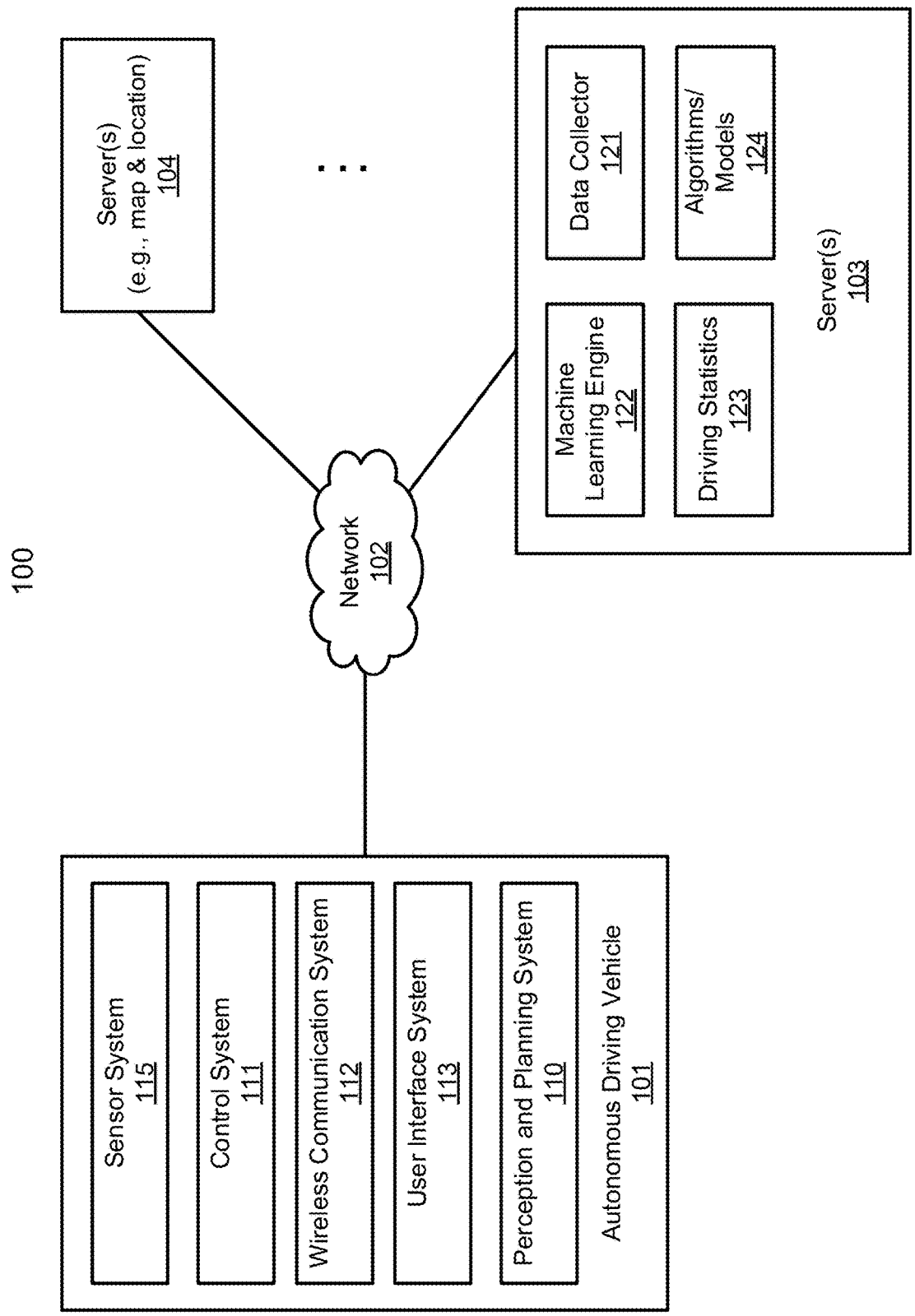
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, during the autonomous driving, the movement trails or moving history of obstacles, as well as, an autonomous driving vehicle (ADV) may be maintained in a corresponding buffer. For each of the obstacles or objects and the ADV, the vehicle states (e.g., location, speed, and/or heading direction) at different points in time are maintained and stored in one or more buffers. The vehicle states representing the moving trails or moving history of the obstacles and the ADV may be utilized to reconstruct a history trajectory of the obstacles and the ADV, which may be used for a variety of purposes. For example, the moving trails or history of obstacles may be utilized to determine lane configuration of one or more lanes of a road, particularly, in a rural area where the lane markings are unclear. The moving history of the obstacles may also be utilized predict the future movement of the obstacles, analyze the traffic condition or congestion, tailgate an obstacle, and infer a lane line (e.g., a lane center line), etc.

According to one embodiment, a driving environment surrounding an ADV is perceived or determined based on sensor data obtained from a variety of sensors, including detecting one or more moving obstacles or moving obstacles. For each of the moving obstacle detected, an obstacle state buffer is allocated to store obstacle states of the moving obstacle at different points in time for a predetermined time period. Each obstacle state includes at least a location of the corresponding moving obstacle at a particular point in time. A further movement of each of the moving obstacle is predicted based on the past obstacle states stored in an associated obstacle state buffer.

In one embodiment, each obstacle state further includes a speed and/or a heading direction of a corresponding moving obstacle at a particular point in time. A vehicle state buffer is further maintained to store vehicle states of the ADV at different points in time. Similarly, a vehicle state includes a location, a speed, and/or a heading direction of a vehicle at a particular point in time. In one embodiment, an analysis is performed on at least a portion of the obstacle states stored in the obstacle state buffers to determine lane configuration of the driving environment. The lane configuration may be determined without using map data of a map associated with the driving environment. In addition, a moving trajectory may be reconstructed for at least one of the moving obstacles based on their corresponding obstacle states retrieved from the corresponding obstacle state buffer. The lane configuration can then be derived based on the reconstructed moving trajectories of the moving obstacles.

In one embodiment, determining the lane configuration includes inferring a lane line such as a lane center line of a lane, lane width, and/or curvature of the lane. The moving trail or moving history of an obstacle can also be utilized to predict the further movement of the obstacle when the obstacle is blocked or blind sighted by another object, either a static or moving object. The obstacle states or moving history of an obstacle can also be utilized for following or tailgating the corresponding obstacle by the ADV by reconstructing the past trajectory of the obstacle and planning a new trajectory of the ADV based on the reconstructed trajectory to follow the obstacle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
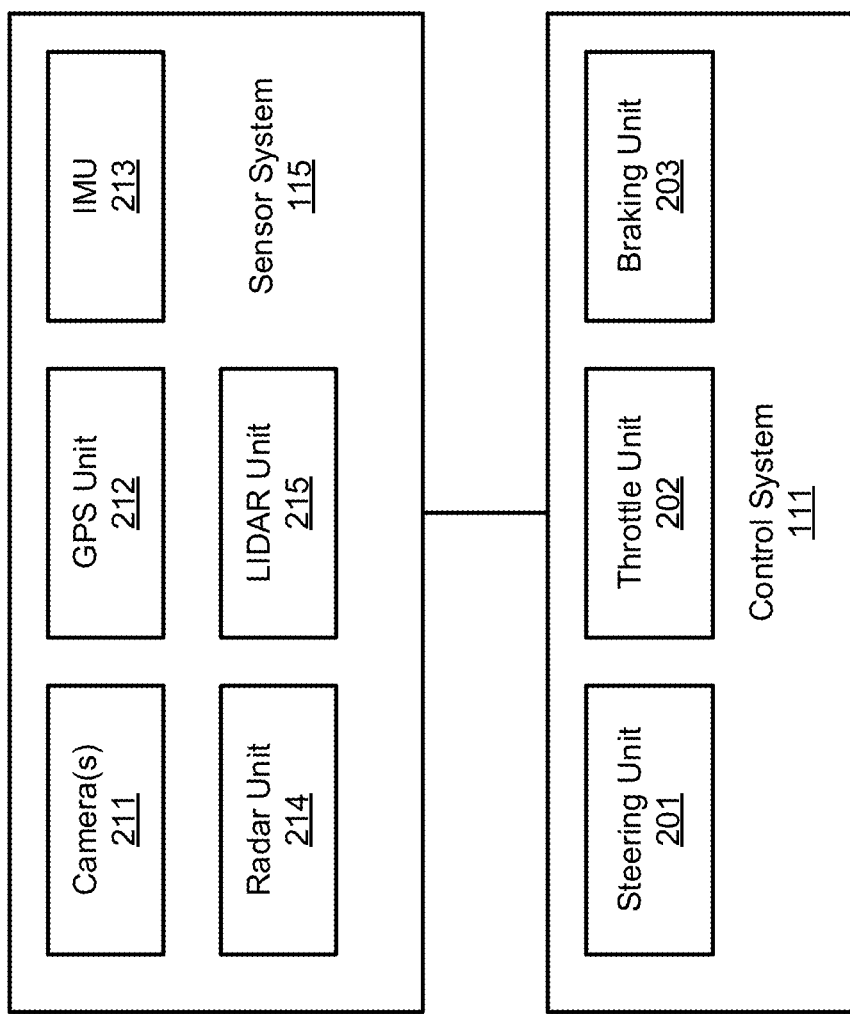
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms to maintain moving history of obstacles and the ADV, to reconstruct a moving trajectory based on the history, to determine lane configuration, and to predict further movement of the obstacles, etc. Algorithms 124 can then be uploaded on ADVs to be utilized during autonomous driving in real-time.

Figure 3A:
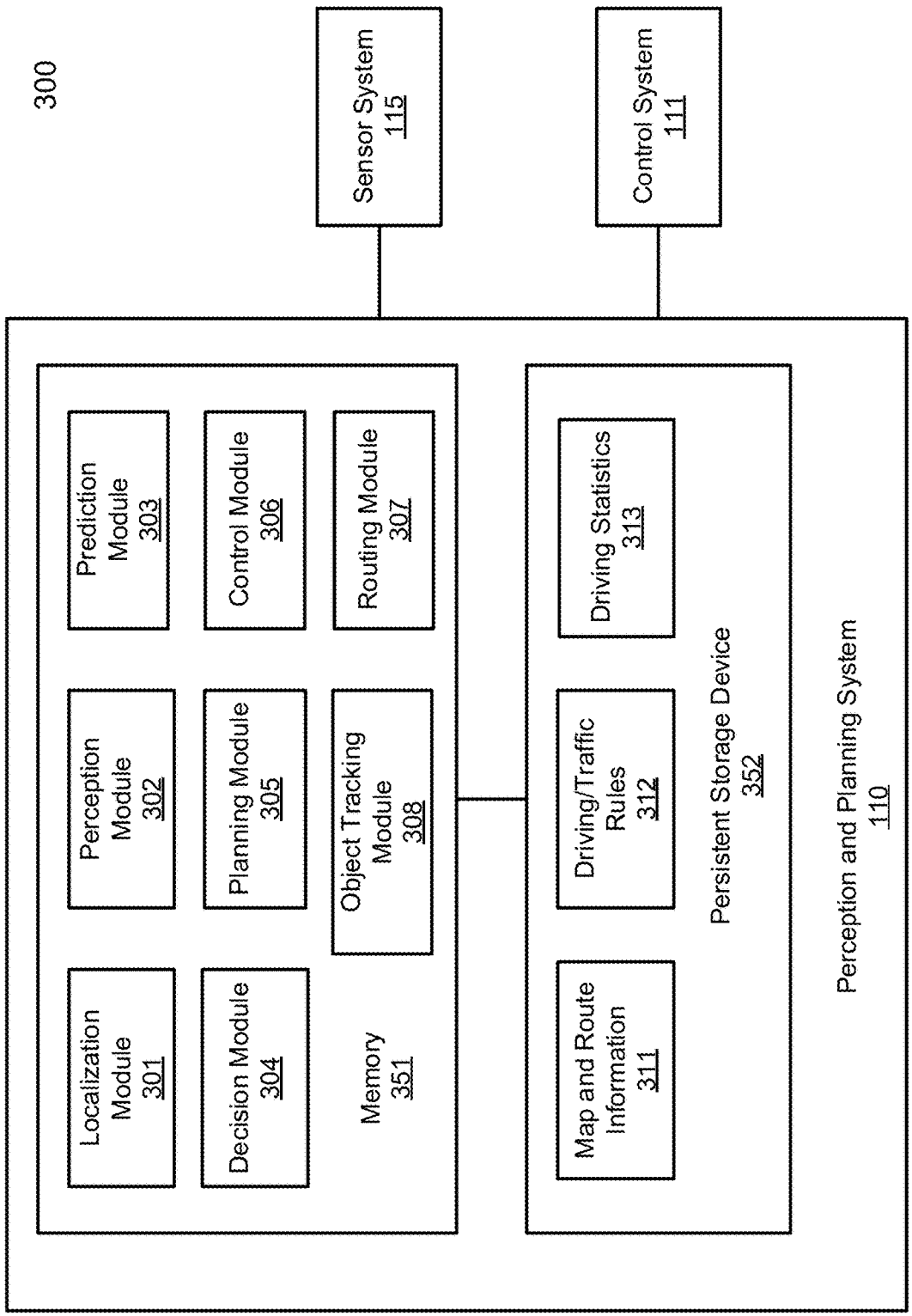
FIGS. 3A-3B are block diagrams illustrating an example of a perception and planning system used with an autonomous vehicle according to one embodiment.
Figure 3B:
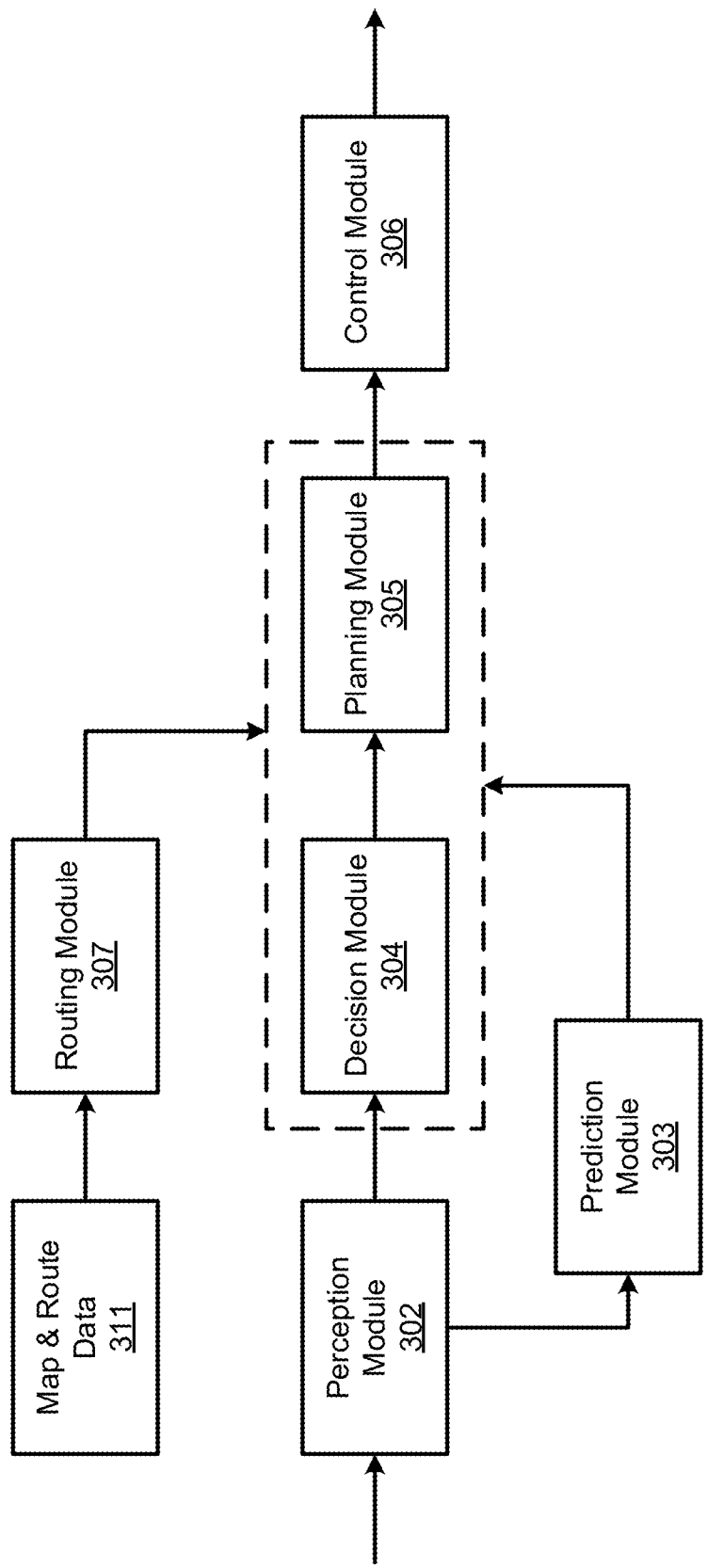

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and object tracking module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, object tracking module 308 is configured to track the movement history of obstacles detected by perception module 302, as well as the movement history of the ADV. Object tracking module 308 may be implemented as part of perception module 302. The movement history of obstacles and the ADV may be stored in respective obstacle and vehicle state buffers maintained in memory 351 and/or persistent storage device 352 as part of driving statistics 313. For each obstacle detected by perception module 302, obstacles states at different points in time over a predetermined time period is determined and maintained in an obstacle state buffer associated with the obstacle maintained in memory 351 for quick access. The obstacle states may further be flushed and stored in persistent storage device 352 as a part of driving statistics 313. The obstacle states maintained in memory 351 may maintained for a shorter time period, while the obstacles states stored in persistent storage device 352 may be maintained for a longer time period. Similarly, the vehicle states of the ADV can also be maintained in both memory 351 and persistent storage device 352 as a part of driving statistics 313.

Figure 4:
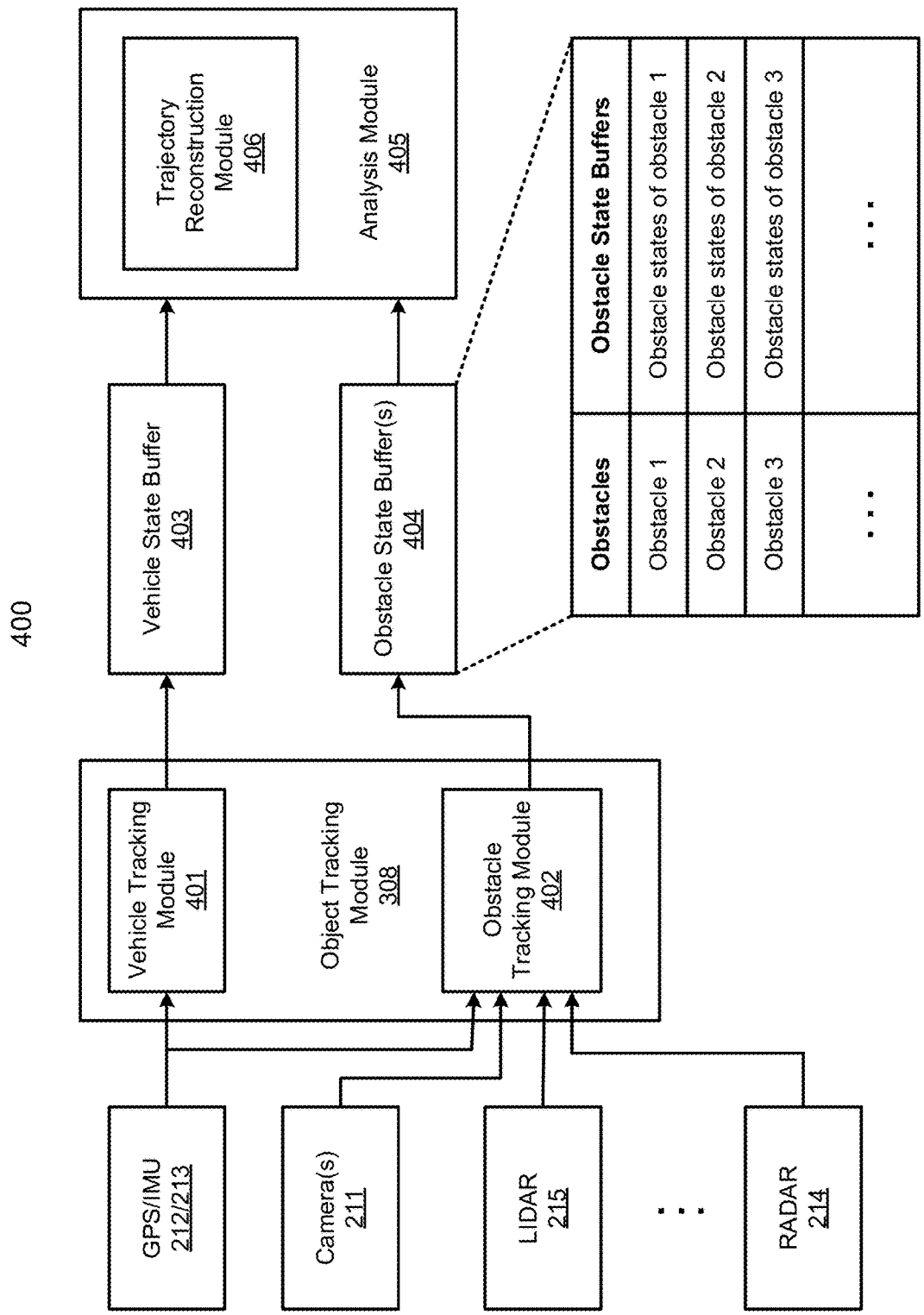
FIG. 4 is a block diagram illustrating an object tracking system according to one embodiment.

FIG. 4 is a block diagram illustrating an object tracking system 400 according to one embodiment. Referring to FIG. 4, object tracking module 308 includes vehicle tracking module 401 and obstacle tracking module 402, which may be implemented as an integrated module. Vehicle tracking module 401 is configured to track the movement of the ADV based on at least GPS signals received from GPS 212 and/or IMU signals received from IMU 213. Vehicle tracking module 401 may perform a motion estimation based on the GPS/IMU signals to determine the vehicle states such as locations, speeds, and heading directions at different points in time. The vehicle states are then stored in vehicle state buffer 403. In one embodiment, vehicle states stored in vehicle state buffer 403 may only contain the locations of the vehicle at different points in time with fixed time increments. Thus, based on the locations at the fixed incremented timestamps, the speed and the heading direction may be derived. Alternatively, a vehicle state may include a rich set of vehicle state metadata including, a location, speed, heading direction, acceleration/deceleration, as well as the control commands issued.

In one embodiment, obstacle tracking module 402 is configured to track the obstacles detected based on sensor data obtained from various sensors, such as, for example, cameras 211, LIDAR 215, and/or RADAR 214. Obstacle tracking module 402 may include a camera object detector/tracking module and a LIDAR object detector/tracking module to detect and track an obstacle captured by an image and an obstacle captured by a LIDAR point cloud respectively. A data fusion operation may be performed on the outputs provided by the camera and LIDAR object detector/tracking modules. In one embodiment, the camera and LIDAR object detector/tracking modules may be implemented in a neural network predictive model to predict and track the movements of the obstacles. The obstacle states of obstacles are then stored obstacle state buffers 404. An obstacle state is similar or identical to a vehicle state as described above.

In one embodiment, for each of the obstacles detected, an obstacle state buffer is allocated to specifically store the obstacle states of the corresponding obstacle. In one embodiment, each of the vehicle state buffer and obstacle state buffers is implemented as a circular buffer, similar to a first-in-first-out (FIFO) buffer, to maintain a predetermined amount of data associated with a predetermined time period. The obstacle states stored in the obstacle state buffers 404 can be utilized to predict future movements of the obstacles, such that a better path for the ADV can be planned to avoid the collision with the obstacles.

For example, under certain circumstances, an obstacle may be blocked by another object that the ADV cannot "see." However, based on the past obstacle states of the obstacle, a further moving trajectory may be predicted, even though the obstacle is out of sight. This is important because an obstacle may be in a blind spot for a moment and the ADV needs to plan by considering the future locations of the obstacle to avoid the potential collision. Alternatively, traffic flows or traffic congestion may be determined based on the trajectories of the obstacles.

According to one embodiment, the obstacle states of an obstacle over a period of time can be utilized to reconstruct a trajectory in the past the obstacle has moved. The reconstructed trajectories of one or more obstacles in the driving environment can be utilized to determine or predict the lane configuration of a road by creating a virtual lane. A lane configuration may include a number of lanes, a lane width, a lane shape or curvature, and/or a lane center line. For example, based on the traffic flows of multiple streams of obstacle flows, a number of lanes can be determined. In addition, an obstacle or moving object moves at the center of a lane in general. Thus by tracking the moving trajectory of an obstacle, a lane center line can be predicted. Further, a lane width can also be determined based on the predicted lane center line by observing the obstacle width plus a minimum clearance space required by the government regulation. Such lane configuration prediction is particular useful when the ADV is driving in a rural area, where the lane markings are unavailable or insufficiently clear.

According to another embodiment, if there is a need for following or tailgating another moving obstacle, the past moving trajectory of that obstacle can be reconstructed based on the obstacle states retrieved from the corresponding obstacle state buffer. A path for tailgating can then be planned based on the reconstructed trajectory of the obstacle to be followed.

Figure 5:
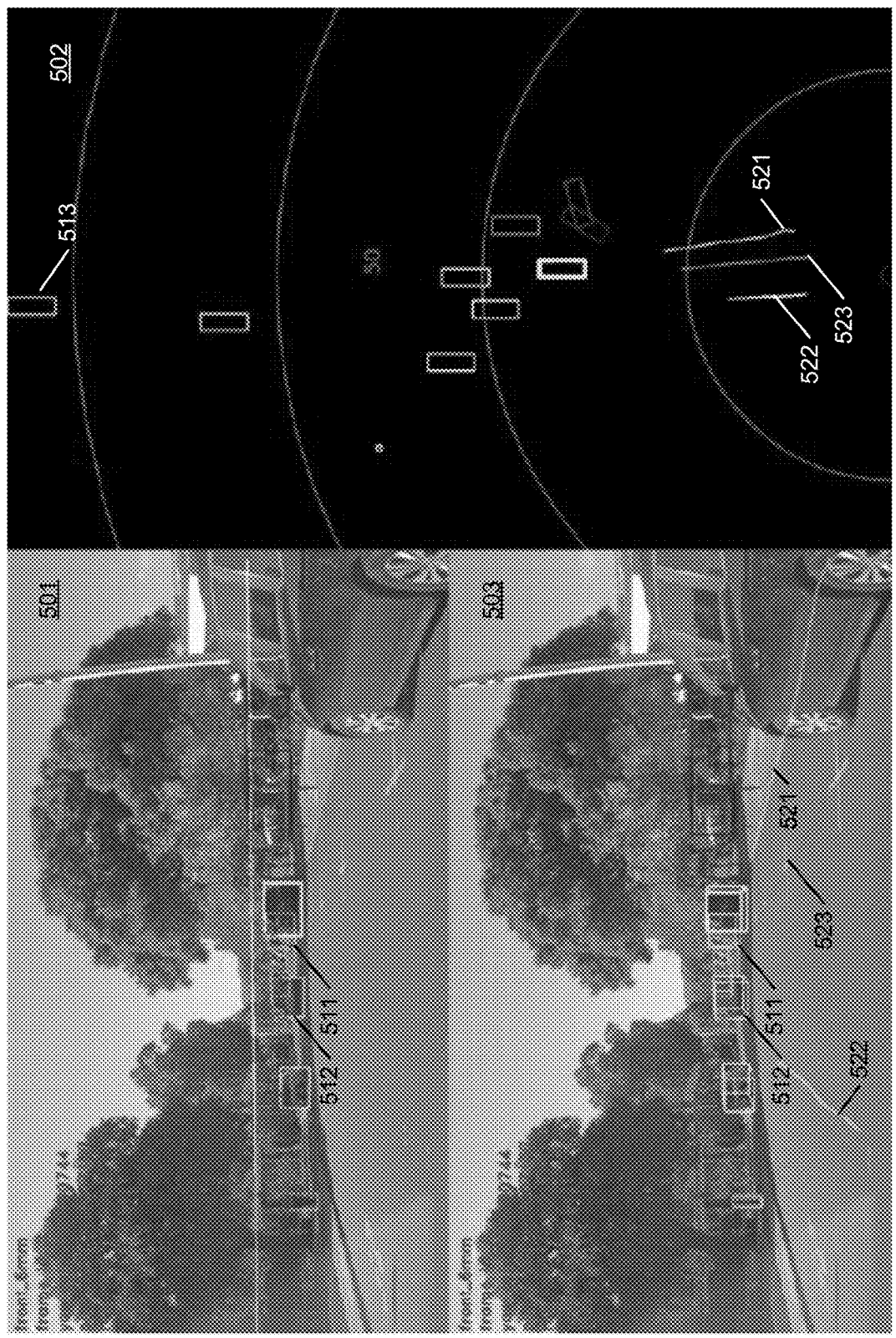
FIG. 5 is a screenshot illustrating a graphical user interface for tracking objects according to one embodiment.

According to one embodiment, the reconstructed trajectories of the obstacles can be displayed on a graphical user interface (GUI) within the ADV at real-time to provide a visual impression to a user within the ADV or alternatively, the GUI can be utilized for analysis such as sensor calibration, online or offline. FIG. 5 is a screenshot of a GUI showing the reconstructed trajectories of obstacles according to one embodiment. Referring to FIG. 5, first image 501 was captured by a camera mounted on an ADV and processed by a perception process to detect and recognize one or more obstacles/objects on the image. For each of the obstacles, a bounding box is generated and superimposed on the first image. In this example, obstacles 511-513 are detected for the purpose of illustration (with 511-512 shown in first image 501 and third image 503, 513 being shown in second image 502). In addition, for each of the detected obstacles, an obstacle state is captured for different points in time (e.g., each driving cycle, i.e., every 100 ms) and stored in a corresponding obstacle state buffer as described above.

First image 501 represents a two-dimensional (2D) view from the front view point of the ADV and displayed on a first display area of a display device. Based on first image 501 and other sensor data such as LIDAR and RADAR sensor data, second image 502 representing a three-dimensional (3D) view, in this example, a top-down view, is generated and displayed on a second display area of the display device. In addition, for at least some of the obstacles that are in view or closer to the ADV, a moving trail or trajectory is reconstructed based on the obstacle state information maintained in a corresponding obstacle state buffer. The reconstructed trajectories are then superimposed on second image 502, in this example, trajectories 521-523 corresponding to obstacles 511-513 respectively. Furthermore, according to one embodiment, a re-projected 2D image 503 is generated based on 2D image 501 and 3D image 502, including the projected trajectories 521-523 in a 2D view. Image 503 is displayed on a third display area of the display device. In this example, images 501-503 are concurrently displayed on the display device. As a result, a user can visually perform a variety of analyses.

Figure 6:
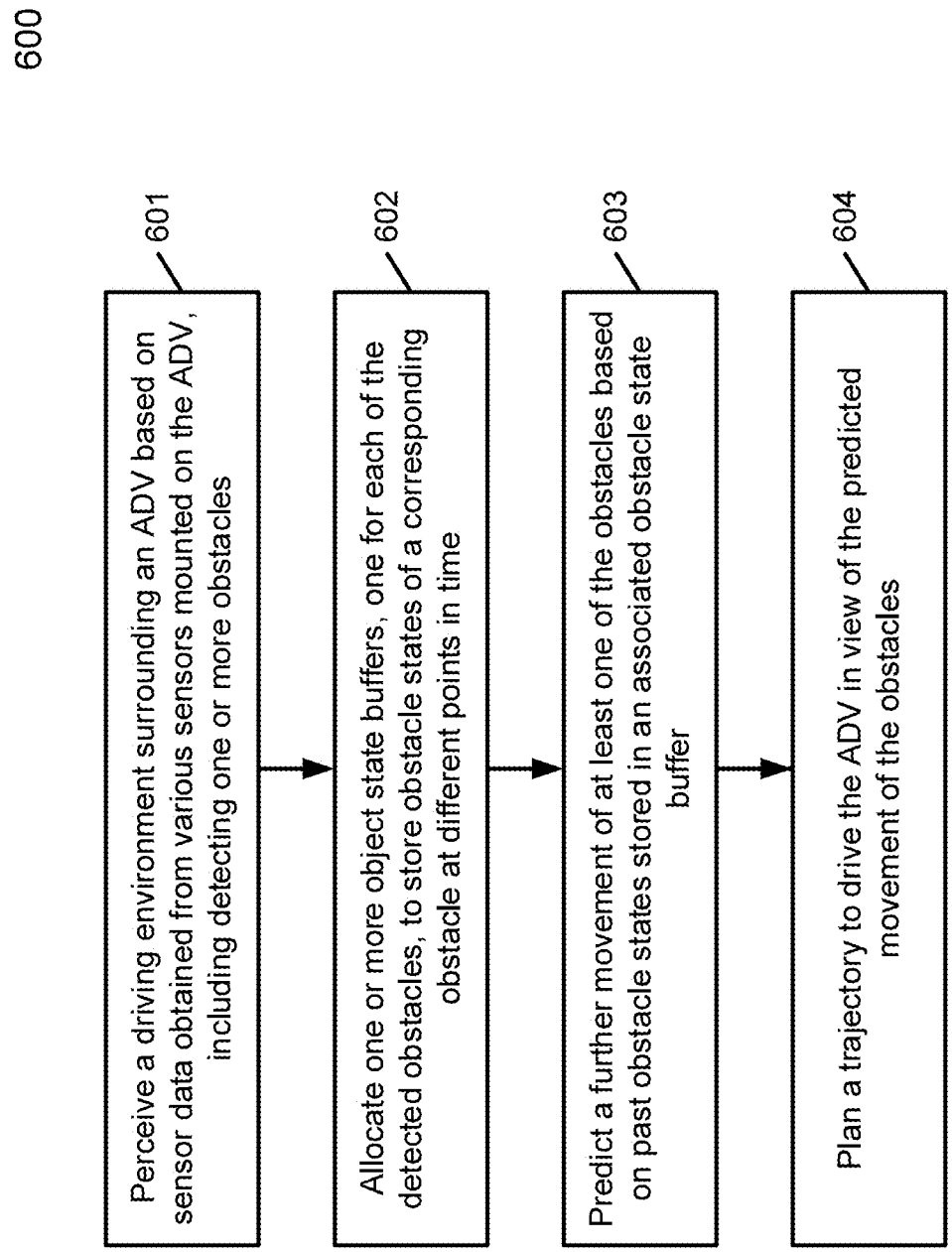
FIG. 6 is a flow diagram illustrating an example of a process for tracking objects according to one embodiment.

FIG. 6 is a flow diagram illustrating an example of a process of tracking moving objects according to one embodiment. Process 600 may be performed by processing logic which may include software, hardware, or a combination thereof. For example, process 600 may be performed by perception module 302 and/or object tracking module 308. Referring to FIG. 6, at block 601, processing logic perceives a driving environment surrounding an ADV based on sensor data obtained from a variety of sensors (e.g., cameras, LIDAR, and/or RADAR), including detecting one or more obstacles. At block 602, for each of the detected obstacles, an obstacle state buffer is allocated to specifically store obstacle states of the obstacles at different points in time for a predetermined time period. Each obstacle state includes at least a location of the corresponding obstacle at a particular point in time. At block 603, a future movement of at least one of the obstacles is predicted based on the information stored in the obstacle state buffer. Based on the predicted movements of the obstacles, at block 604, a trajectory is planned to drive the ADV, for example, to avoid collision with any of the obstacles.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

perceiving a driving environment surrounding an ADV based on sensor data obtained from a plurality of sensors, including detecting one or more moving obstacles;

allocating one or more obstacle state buffers, one for each of the one or more moving obstacles to store obstacle states of a corresponding moving obstacle at different points in time for a predetermined time period, wherein each obstacle state includes at least a location of the corresponding moving obstacle at a particular point in time;

inferring a lane center line of a lane based on the obstacle states retrieved from at least one of the obstacle state buffers;

determining a lane width based on the inferred lane center line, an obstacle width of a corresponding moving obstacle, and a required minimum clearance space;

predicting a further movement of at least one of the one or more moving obstacles based on past obstacle states stored in an associated obstacle state buffer; and planning a trajectory to drive the ADV based on the lane width and the predicted further movement of the at least one of the one or more moving obstacles to avoid a collision with any one of the one or more moving obstacles.

2. The method of claim 1, wherein movement of the at least one of the one or more moving obstacles is not able to be sensed by the ADV and would cause the one of the one or more moving obstacles to collide with the ADV if the trajectory was not based on the predicted further movement.

3. The method of claim 1, wherein predicting the further movement of the at least one of the one or more moving obstacles comprises:

reconstructing a first past moving trajectory for the at least one of the one or more moving obstacles for a first past period of time with a first portion of the past obstacle states; and predicting a second past moving trajectory for the at least one of the one or more moving obstacles for a second past period of time using a past moving trajectory.

4. The method of claim 1, further comprising performing an analysis on the obstacle states stored in the obstacle state buffers to determine lane configuration of the driving environment without using map data of a map associated with the driving environment.

5. The method of claim 4, further comprising reconstructing a moving trajectory of each of the one or more moving obstacles based on its obstacle states retrieved from the corresponding obstacle state buffer, wherein the lane configuration is derived based on the moving trajectories of the one or more moving obstacles.

6. The method of claim 1, further comprising:

detecting that a first moving obstacle is blocked by a static obstacle; and predicting movement of the first moving obstacle based on obstacle states stored in a first obstacle state buffer associated with the first moving obstacle, while the first moving obstacle remains blocked by the static obstacle.

7. The method of claim 1, further comprising:

in response to a request for following a second moving obstacle, retrieving obstacle states from a second obstacle state buffer associated with the second moving obstacle;

reconstructing a second moving trajectory from the obstacle states retrieved from the second obstacle state buffer; and planning a trajectory for the ADV based on the second moving trajectory.

8. A non-transitory machine-readable medium having instructions stored therein, which when executed by a processor, cause the processor to perform operations, the operations comprising:
perceiving a driving environment surrounding an ADV based on sensor data obtained from a plurality of sensors, including detecting one or more moving obstacles;
allocating one or more obstacle state buffers, one for each of the one or more moving obstacles to store obstacle states of a corresponding moving obstacle at different points in time for a predetermined time period, wherein each obstacle state includes at least a location of the corresponding moving obstacle at a particular point in time;
inferring a lane center line of a lane based on the obstacle states retrieved from at least one of the obstacle state buffers;
determining a lane width based on the inferred lane center line, an obstacle width of a corresponding moving obstacle, and a required minimum clearance space;
predicting a further movement of at least one of the one or more moving obstacles based on past obstacle states stored in an associated obstacle state buffer; and
planning a trajectory to drive the ADV based on the lane width and the predicted further movement of the at least one of the one or more moving obstacles to avoid a collision with any one of the one or more moving obstacles.

9. The machine-readable medium of claim 8, wherein movement of the at least one of the one or more moving obstacles is not able to be sensed by the ADV and would cause the one of the one or more moving obstacles to collide with the ADV if the trajectory was not based on the predicted further movement.

10. The machine-readable medium of claim 8, wherein predicting the further movement of the at least one of the one or more moving obstacles comprises:
reconstructing a first past moving trajectory for the at least one of the one or more moving obstacles for a first past period of time with a first portion of the past obstacle states; and
predicting a second past moving trajectory for the at least one of the one or more moving obstacles for a second past period of time using a past moving trajectory.

11. The machine-readable medium of claim 8, wherein the operations further comprise performing an analysis on the obstacle states stored in the obstacle state buffers to determine lane configuration of the driving environment without using map data of a map associated with the driving environment.

12. The machine-readable medium of claim 11, wherein the operations further comprise reconstructing a moving trajectory of each of the one or more moving obstacles based on its obstacle states retrieved from the corresponding obstacle state buffer, wherein the lane configuration is derived based on the moving trajectories of the one or more moving obstacles.

13. The machine-readable medium of claim 8, wherein the operations further comprise:
detecting that a first moving obstacle is blocked by a static obstacle; and
predicting movement of the first moving obstacle based on obstacle states stored in a first obstacle state buffer associated with the first moving obstacle, while the first moving obstacle remains blocked by the static obstacle.

14. The machine-readable medium of claim 8, wherein the operations further comprise:
in response to a request for following a second moving obstacle, retrieving obstacle states from a second obstacle state buffer associated with the second moving obstacle;
reconstructing a second moving trajectory from the obstacle states retrieved from the second obstacle state buffer; and
planning a trajectory for the ADV based on the second moving trajectory.

15. A data processing system, comprising:
a processor; and
a memory coupled to the processor to store instructions, which when executed by the processor, cause the processor to perform operations, the operations including:
perceiving a driving environment surrounding an ADV based on sensor data obtained from a plurality of sensors, including detecting one or more moving obstacles;
allocating one or more obstacle state buffers, one for each of the one or more moving obstacles to store obstacle states of a corresponding moving obstacle at different points in time for a predetermined time period, wherein each obstacle state includes at least a location of the corresponding moving obstacle at a particular point in time;
inferring a lane center line of a lane based on the obstacle states retrieved from at least one of the obstacle state buffers;
determining a lane width based on the inferred lane center line, an obstacle width of a corresponding moving obstacle, and a required minimum clearance space;
predicting a further movement of at least one of the one or more moving obstacles based on past obstacle states stored in an associated obstacle state buffer; and
planning a trajectory to drive the ADV based on the lane width and the predicted further movement of the at least one of the one or more moving obstacles to avoid a collision with any one of the one or more moving obstacles.

16. The system of claim 15, wherein each obstacle state further comprises a speed and heading direction of the corresponding moving obstacle at the particular point in time.

17. The system of claim 15, wherein predicting the further movement of the at least one of the moving obstacles comprises:
reconstructing a first past moving trajectory for the at least one of the one or more moving obstacles for a first past period of time with a first portion of the past obstacle states; and
predicting a second past moving trajectory for the at least one of the one or more moving obstacles for a second past period of time using a past moving trajectory.

18. The system of claim 15, wherein the further movement of the at least one of the one or more moving obstacles is not able to be sensed by the ADV and would cause the one of the one or more moving obstacles to collide with the ADV if the trajectory was not based on the predicted further movement.

* * * * *